United States Patent
Hung et al.

(10) Patent No.: US 8,547,032 B2
(45) Date of Patent: Oct. 1, 2013

(54) METHOD AND DEVICE FOR DRIVING LIGHT-EMITTING DIODE BY ALTERNATING CURRENT INPUT VOLTAGE

(75) Inventors: Chen-Ming Hung, Hsinchu (TW); I-Fong Chen, Hsinchu (TW); Maung Maung Win, Hsinchu (TW); Chih-Yuan Hsieh, Hsinchu County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 372 days.

(21) Appl. No.: 12/880,143

(22) Filed: Sep. 12, 2010

(65) Prior Publication Data

US 2011/0273113 A1    Nov. 10, 2011

(30) Foreign Application Priority Data

May 6, 2010  (TW) ................................ 99114503 A (51) Int. Cl.
*H05B 41/16* (2006.01)
(52) U.S. Cl.
USPC ........ 315/247; 315/185 S; 315/291; 315/307; 315/312

(58) Field of Classification Search
USPC ................ 315/247, 224, 225, 291, 307–326, 315/185 S
See application file for complete search history.

(56) References Cited

U.S. PATENT DOCUMENTS

| 2010/0309692 A1* | 12/2010 | Chisenga et al. ............... 363/37 |
| 2011/0037414 A1* | 2/2011 | Wang et al. .................... 315/297 |
| 2012/0154260 A1* | 6/2012 | Decraemer et al. ............. 345/82 |

FOREIGN PATENT DOCUMENTS

| CN | 2519582 Y | 10/2002 |
| TW | I263195 | 10/2006 |
| TW | 200913764 | 3/2009 |
| TW | 201002133 | 1/2010 |
| TW | 201010498 | 3/2010 |

* cited by examiner

*Primary Examiner* — Tuyet Thi Vo
(74) *Attorney, Agent, or Firm* — Winston Hsu; Scott Margo (57) ABSTRACT

A method for driving a light-emitting diode based upon an AC input voltage includes receiving and full-wave rectifying the AC input voltage to generate a full-wave rectified input voltage, generating a pulse width modulation signal according to the full-wave rectified input voltage and a luminance signal, and generating a driving voltage according to the pulse width modulation signal and the full-wave rectified input voltage, and applying the driving voltage to the light-emitting diode.

20 Claims, 8 Drawing Sheets

METHOD AND DEVICE FOR DRIVING LIGHT-EMITTING DIODE BY ALTERNATING CURRENT INPUT VOLTAGE

BACKGROUND OF THE INVENTION

1. Field of the Invention

The present invention is related to a method and device for driving a light-emitting diode, and more particularly, to a method and device for driving the light-emitting diode by an alternating current voltage.

2. Description of the Prior Art

A light-emitting diode (LED) is characterized by low power consumption, long lifetime and short reaction time, and therefore LED lamps are gradually replacing traditional tungsten lamps and fluorescent lamps. Similar to the tungsten lamp, light emitted by the LED lamp is adjusted based on practical requirements. Since the LED benefits from short reaction time, the LED lamp is generally controlled according to a pulse width modulation (PWM) scheme. That is, the LED lamp controls brightness by adjusting a "lit" duty cycle of the LED.

In general, to employ the PWM scheme, the LED lamp first has to convert an alternating current (AC) voltage, such as a voltage provided by mains power, into a direct current (DC) voltage, so as to process following logic operations. To convert the AC voltage into the DC voltage, the LED lamp has to include a large capacitor as a charge exchanging medium. However, partial LED lamps are not allowed to include the large capacitor due to cost and specification concerns. Therefore, if the LED is directly driven by the AC voltage, manufacturing costs and design complexity of the LED lamp can be effectively reduced.

Therefore, directly driving the LED by the AC voltage has been a major focus of the industry.

SUMMARY OF THE INVENTION

It is therefore a primary objective of the claimed invention to provide a method and device for driving a light-emitting diode and a related pulse width percentage generator.

The present invention discloses a method for driving a light-emitting diode (LED) by an alternating current (AC) input voltage. The method comprises full-wave rectifying the AC input voltage to generate a full-wave rectified input voltage, generating a pulse width modulation (PWM) signal according to the full-wave rectified input voltage and a luminance signal, generating a driving voltage according to the PWM signal and the full-wave rectified input voltage, and outputting the driving voltage to the LED.

The present invention further discloses a driving device for driving a light-emitting diode (LED) by an alternating current (AC) input voltage. The driving device comprises a rectifier for full-wave rectifying the AC input voltage to generate a full-wave rectified input voltage, an output module for generating a driving voltage according to a pulse width modulation (PWM) signal and the full-wave rectified input voltage, an output end for outputting driving voltage to the LED, a pulse width percentage generator for generating the PWM signal according to the full-wave rectified input voltage and a luminance signal, and a switch module for determining whether the full-wave rectified input voltage is sent to the output module according to the PWM signal.

The present invention further discloses a pulse width percentage generator for generating a pulse width modulation (PWM) signal according to a full-wave rectified input voltage and a luminance signal. The pulse width percentage generator comprises a comparator for comparing the full-wave rectified input voltage and a threshold voltage to generate a comparison result, a counter for counting number of cycles the full-wave rectified input voltage is greater than the threshold voltage according to the comparison result during a standard cycle of a clock signal to generate a cycle count, a microcontroller for determining a valid period according to the cycle count and generating the PWM signal according to the comparison result, a rest period and a lighting period, a conversion device for converting the luminance signal into a pulse width percentage, and a period computer for computing the lighting period and the rest period according to the valid period and the pulse width percentage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
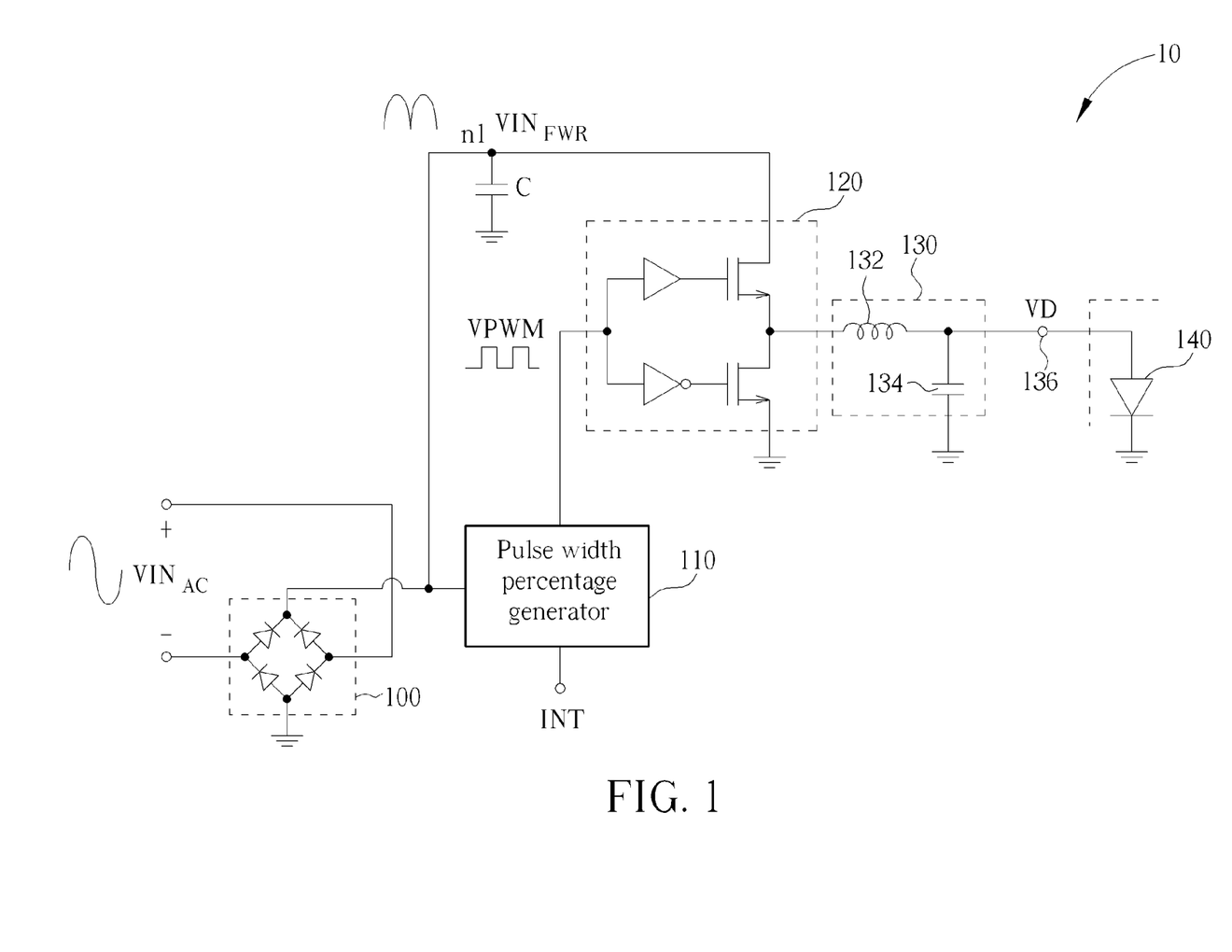
FIG. 1 is a schematic diagram of a light-emitting diode (LED) driving device.

Please refer to FIG. 1, which is a schematic diagram of a light-emitting diode (LED) driving device 10. The LED driving device 10 drives an LED 140 by an alternating current (AC) input voltage $VIN_{AC}$ based on a pulse width modulation (PWM) scheme. The driving device 10 includes a rectifier 100, a pulse width percentage generator 110, a switch module 120, an output module 130 and an output end 136. The rectifier 100 is utilized for full-wave rectifying the AC input voltage $VIN_{AC}$ to generate a full-wave rectified input voltage $VIN_{FWR}$. The pulse width percentage generator 110 is utilized for generating a PWM signal VPWM according to the full-wave rectified input voltage $VIN_{FWR}$ and a luminance signal INT. The switch module 120 is utilized for determining whether the full-wave rectified input voltage $VIN_{FWR}$ is sent to the output module 130 according to the PWM signal VPWM. The output module is utilized for generating a driving voltage VD according to the PWM signal VPWM and the full-wave rectified input voltage $VIN_{FWR}$. Finally, the output end 136 outputs the driving voltage VD to the LED 140 to generate light required by a user.

Figure 2A:
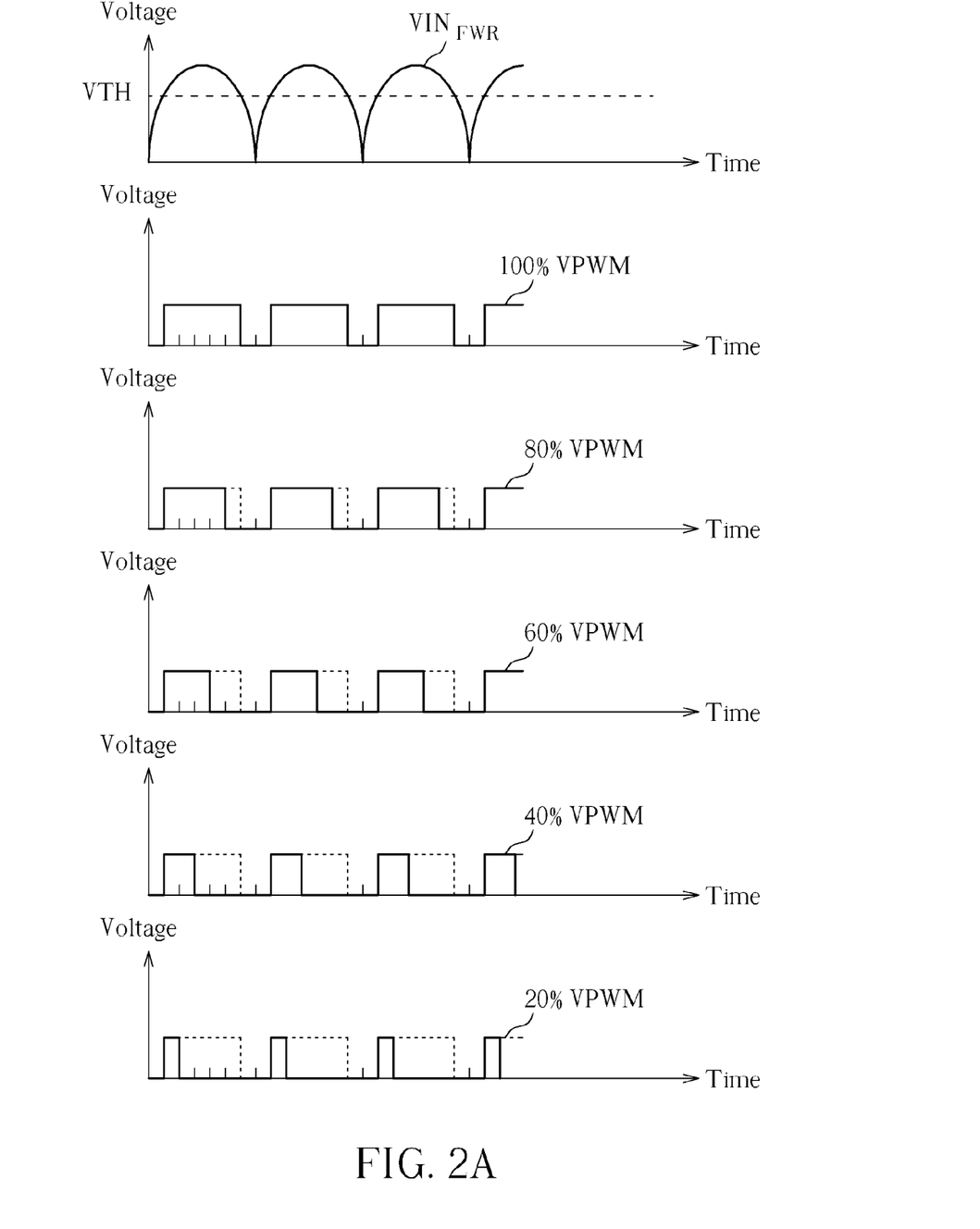
FIG. 2A is a time-variant schematic diagram of related signals of the LED driving device shown in FIG. 1.

For example, the user may choose one of five luminance levels respectively corresponding to 20%, 40%, 60%, 80% and 100% duty cycles of the PWM signal VPWM. That is, the user can choose to light the LED 140 for 20%, 40%, 60%, 80% or 100% of time. Note that, since the full-wave rectified input voltage $VIN_{FWR}$ has to be greater than a threshold voltage VTH of the LED 140 to enable the LED 140, periods when the full-wave rectified input voltage $VIN_{FWR}$ is lower than the threshold voltage VTH are not taken into consideration when defining 20%, 40%, 60%, 80% and 100% duty cycles of the PWM signal VPWM, so as to simplify calculation, as illustrated in FIG. 2A.

Figure 2B:
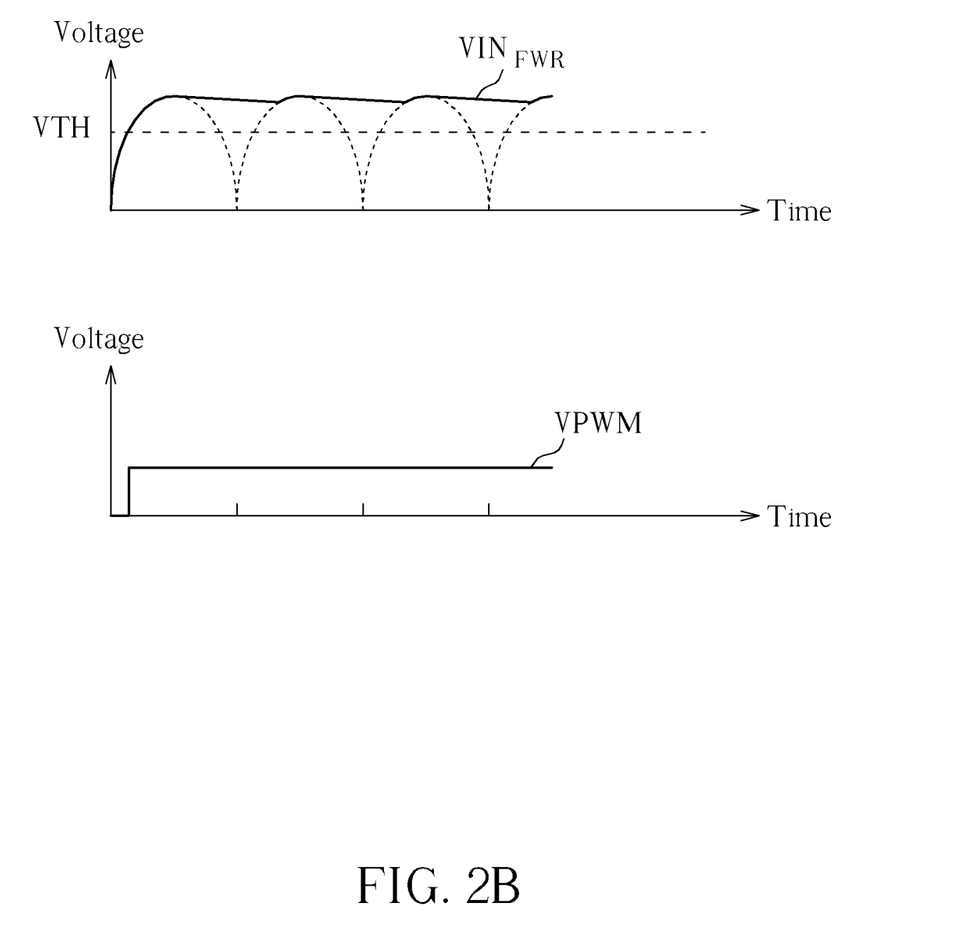
FIG. 2B is a time-variant schematic diagram of a full-wave rectified input voltage and a pulse width modulation signal of the LED driving device shown in FIG. 1.

However, in the LED driving device 10, capacitor C is coupled between a node n1 corresponding to the full-wave rectified input voltage $VIN_{FWR}$ and a ground end, as illustrated in FIG. 1. For example, if the duty cycle of the PWM signal VPWM is 60%, the LED 140 draws no current when the switch module 120 is disabled. In such a situation, charge stored in the capacitor C cannot be discharged, and therefore the full-wave rectified input voltage $VIN_{FWR}$ cannot be decreased, as illustrated in FIG. 2B. In short, the pulse width percentage generator 110 has to compare the full-wave rectified input voltage $VIN_{FWR}$ and the threshold voltage VTH to generate the PWM signal VPWM, accordingly, as illustrated in FIG. 2A. As long as the full-wave rectified input voltage $VIN_{FWR}$ is distorted, the PWM signal VPWM is accordingly distorted, as illustrated in FIG. 2B.

Figure 3:
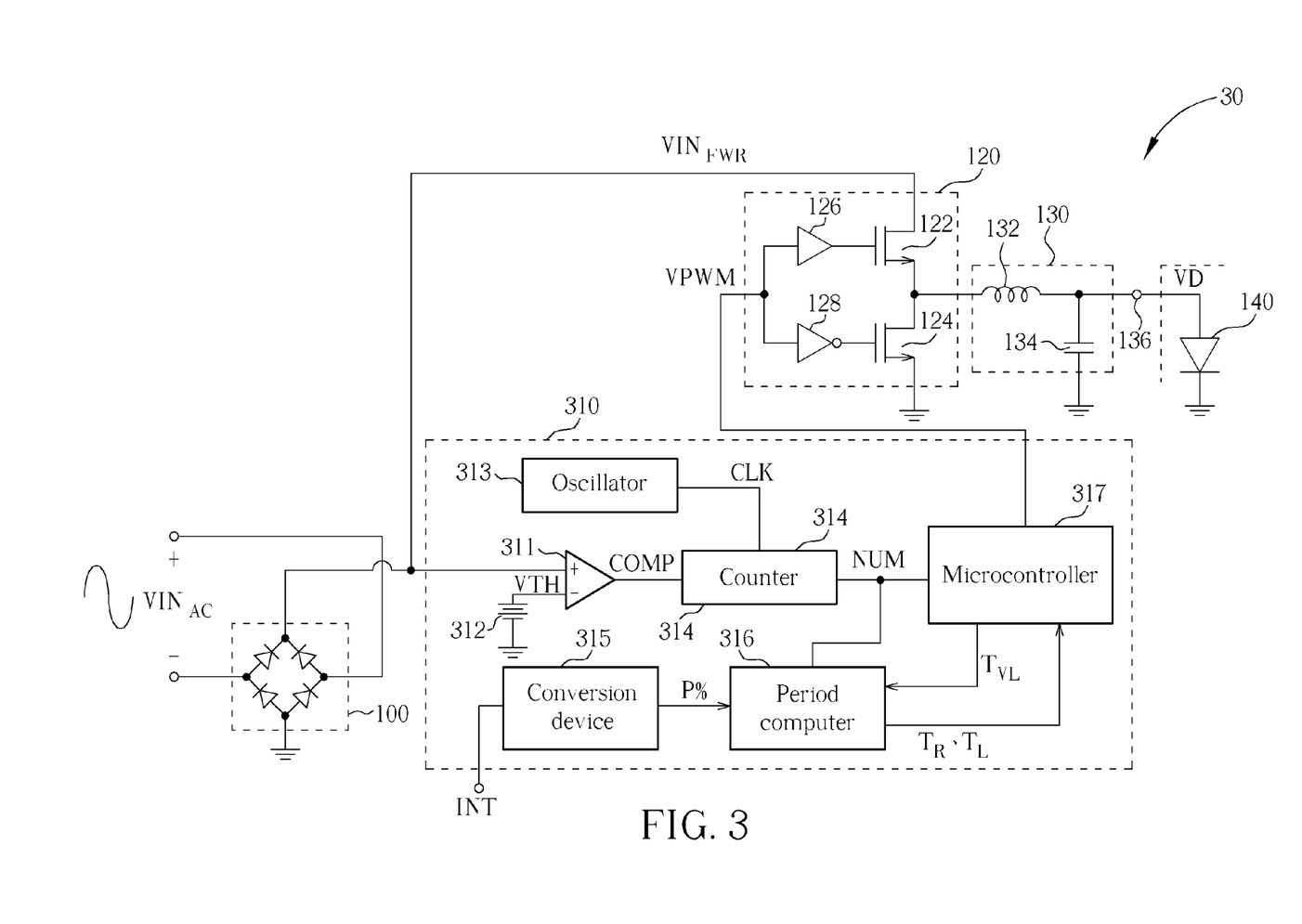
FIG. 3 is a schematic diagram of a LED driving device according to an embodiment of the present invention.
Figure 4A:
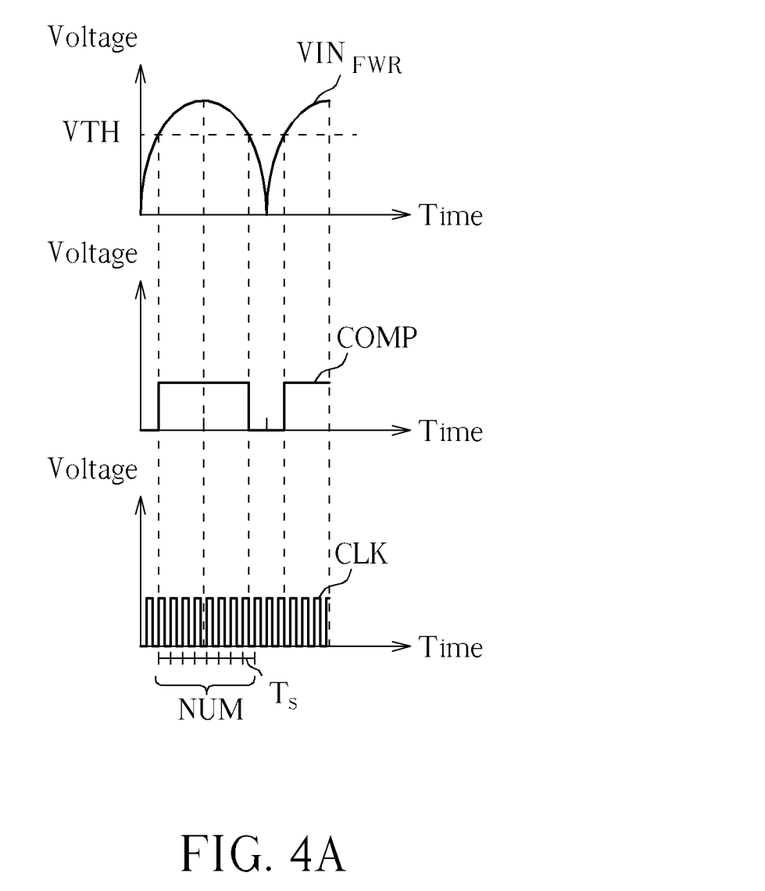
FIG. 4A, FIG. 4B, and FIG. 4C are time-variant schematic diagram of related signals of the LED driving device shown in FIG. 3.

In order to solve the distortion problem of the full-wave rectified input voltage $VIN_{FWR}$, please refer to FIG. 3, which is a schematic diagram of an LED driving device 30 according to an embodiment of the present invention. The LED driving device 30 is similar to the LED driving device 10. Identical components of the LED driving device 30 and the LED driving device 10 are labeled by the same reference numerals. The LED driving device 30 differs only in a pulse width percentage generator 310 which replaces the pulse width percentage generator 110 shown in FIG. 1. The pulse width percentage generator 310 includes a comparator 311, a threshold voltage generator 312, an oscillator 313, a counter 314, a conversion device 315, a period computer 316 and a microcontroller 317. The threshold voltage generator 312 generates the threshold voltage VTH based on component characteristics of the LED 140. The comparator 311 is utilized for comparing the full-wave rectified input voltage $VIN_{FWR}$ and the threshold voltage VTH to generate a comparison result COMP. The oscillator 313 is utilized for generating a clock signal CLK. The counter 314 is utilized for counting number of cycles the full-wave rectified input voltage $VIN_{FWR}$ is greater than the threshold voltage VTH according to the comparison result COMP during a standard cycle $T_s$ of the clock signal CLK to generate a cycle count NUM, as illustrated in FIG. 4A. In addition, the conversion device 315 converts the luminance signal INT into a pulse width percentage P %, for example:

| INT | | P % |
|---|---|---|
| level 1 | → | 20% |
| level 2 | → | 40% |
| level 3 | → | 60% |
| level 4 | → | 80% |
| level 5 | → | 100% |

The microcontroller 317 is utilized for determining a valid period $T_{VL}$ according to the cycle count NUM, i.e. $T_{VL}=NUM \times T_S$. Next, the period computer 316 computes a lighting period $T_L$ and a rest period $T_R$ according to the valid period $T_{VL}$ and the pulse width percentage P %. Finally, the microcontroller 317 generates the PWM signal VPWM according to the comparison result COMP, the rest period $T_R$ and the lighting period $T_L$.

In short, the LED driving device 30 redistributes periods in which the PWM signal VPWM is equal to "1" based on periodic and symmetrical waveforms of the full-wave rectified input voltage $VIN_{FWR}$. As a result, the correct PWM signal VPWM can be generated, since the full-wave rectified input voltage $VIN_{FWR}$ is no longer distorted.

Figure 4B:
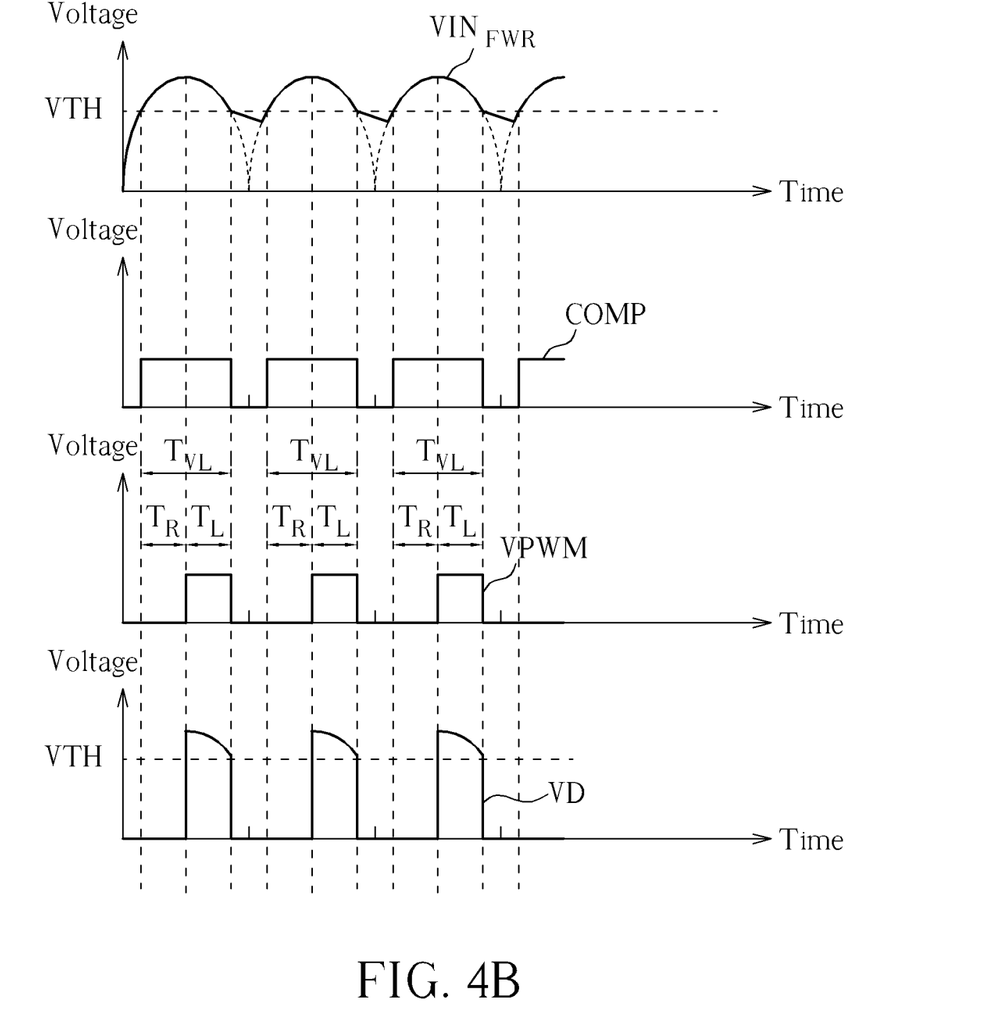

More specifically, the microcontroller 317 disables the PWM signal VPWM when the comparison result COMP indicates that the full-wave rectified input voltage $VIN_{FWR}$ is lower than the threshold voltage VTH. On the contrary, when the comparison result COMP indicates that the full-wave rectified input voltage $VIN_{FWR}$ is greater than the threshold voltage VTH, the microcontroller 317 continues to disable the PWM signal VPWM for the rest period $T_R$, and then enables the PWM signal VPWM for the lighting period $T_L$, as illustrated in FIG. 4B. As a result, the LED 140 can draw current during a latter half of the valid period $T_{VL}$ to generate the correct comparison result COMP at the next valid period $T_{VL}$, so as to drive the LED 140 with the desired pulse width percentage P %. In other words, in comparison with the LED driving device 10, the LED driving device 30 assigns the lighting period $T_L$ to the latter half of the valid period $T_{VL}$, such that the capacitor C can be discharged through the switch module 120.

Other than switching orders of the lighting period $T_L$ and the rest period $T_R$, the LED driving device 30 further can enable the switch module 120 in an "invalid" period to ensure that the full-wave rectified input voltage $VIN_{FWR}$ is lower than the threshold voltage VTH in the "invalid" period to generate the correct comparison result COMP at the next valid period $T_{VL}$. Since the comparison result COMP is the reference for generating the PWM signal VPWM, the correct comparison result COMP can guarantee that the driving voltage VD drives the LED 140 with the desired pulse width percentage P %. More specifically, the microcontroller has to enable the PWM signal VPWM when the comparison result COMP indicates that the full-wave rectified input voltage $VIN_{FWR}$ is lower than the threshold voltage VTH. In addition, preferably, the microcontroller 317 switches the PWM signal VPWM to "1" when the comparison result COMP indicates that the full-wave rectified input voltage $VIN_{FWR}$ is greater than the threshold voltage VTH, which lasts for the lighting period $T_L$, and then switches the PWM signal VPWM to "0" for the rest period $T_R$, as illustrated in FIG. 4C.

Figure 4C:
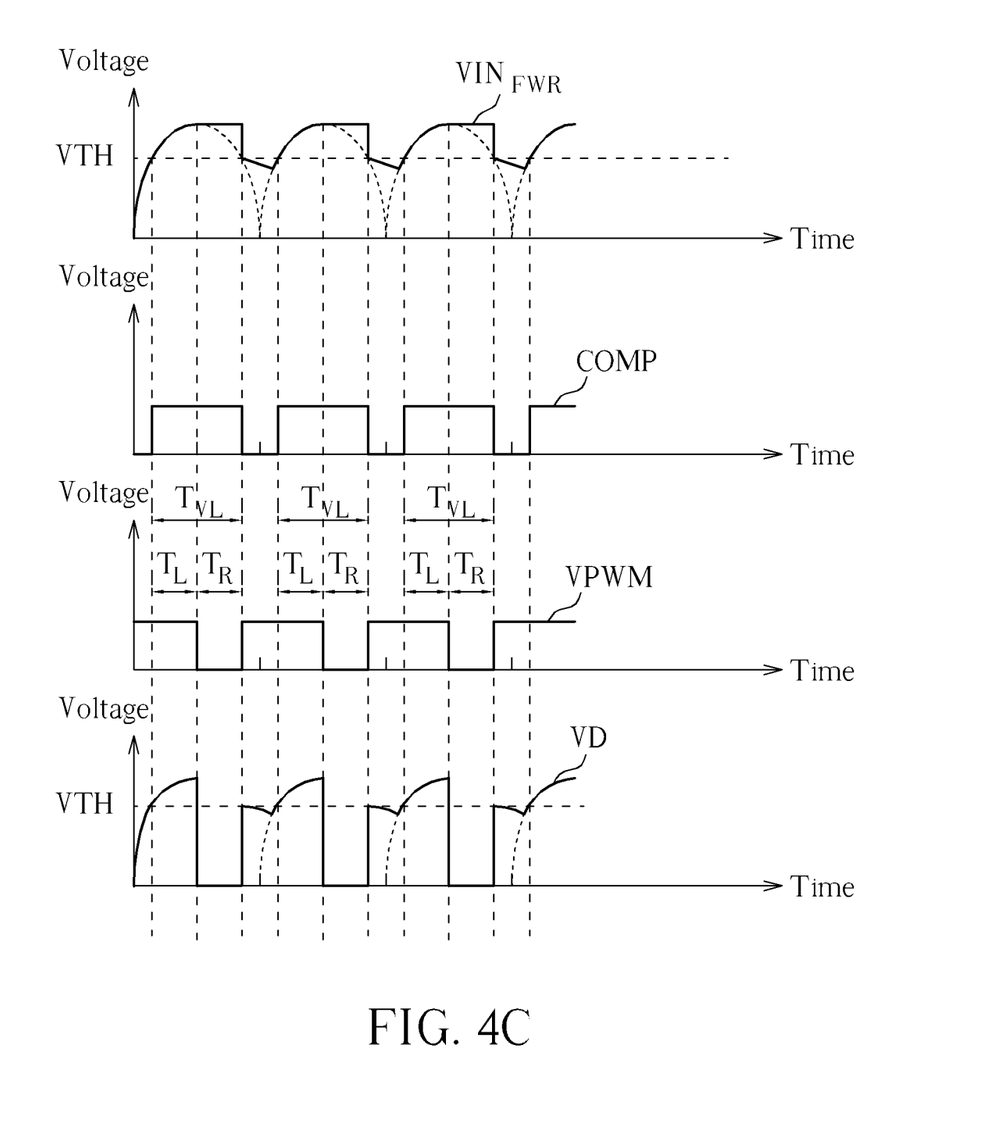

Even though the duty cycle of the PWM signal VPWM shown in FIG. 4C is greater than the duty cycle of the PWM signal VPWM shown in FIG. 4B, the LED 140 in the case of FIG. 4B is lit for as long as the case of FIG. 4C, since the driving voltage VD has to be greater than the threshold voltage to drive the LED 140. That is, as long as the full-wave rectified input voltage $VIN_{FWR}$ is lower than the threshold voltage VTH in the "invalid" periods, the comparator 311 can generate the comparison result COMP with the correct valid period $T_{VL}$, so as to drive the LED 140 with the desired pulse width percentage P %.

In detail, the period computer 316 computes the lighting period as $T_L=T_{VL} \times P$ %, and computes the rest period as $T_R=T_{VL} \times (1-P\%)$, i.e. $T_R=T_{VL} \times (1-P\%)$ and $T_R=NUM \times (1-P\%) \times T_S$. As a result, the microcontroller 317 can switch a voltage level of the PWM signal VPWM in a timely manner based on the cycle count NUM counted by the counter 314. For example, according to the PWM scheme shown in FIG. 4A, the counter 314 starts to count once every standard period $T_S$, and the PWM signal VPWM is switched from "0" to "1" when the cycle count NUM reaches NUM×(1−P %). As a result, lengths of the lighting period $T_L$ and the rest period $T_R$ can conform to the pulse width percentage P %.

As to component details, the switch module 120 includes a front end $n_f$, an upper-bridge switch transistor 122, a lower-bridge switch transistor 124, an in-phase amplifier 126 and an inverting amplifier 128. Preferably, the upper-bridge switch transistor 122 and the lower-bridge switch transistor 124 are n-type Metal oxide Semiconductor (MOS) transistors. Operations of the switch module 120 are not the major focus of the present invention, and therefore are not narrated herein.

As illustrated in FIG. 4B and FIG. 4C, a relationship among the full-wave rectified input voltage $VIN_{FWR}$, the PWM signal VPWM and the driving voltage VD can be summarized as $VD=VIN_{FWR}\cap PWM$. Therefore, the output module 130 preferably includes an output inductor 132 and an output capacitor 134 to generate the driving voltage VD through a frequency response of the output module 130.

Figure 5:
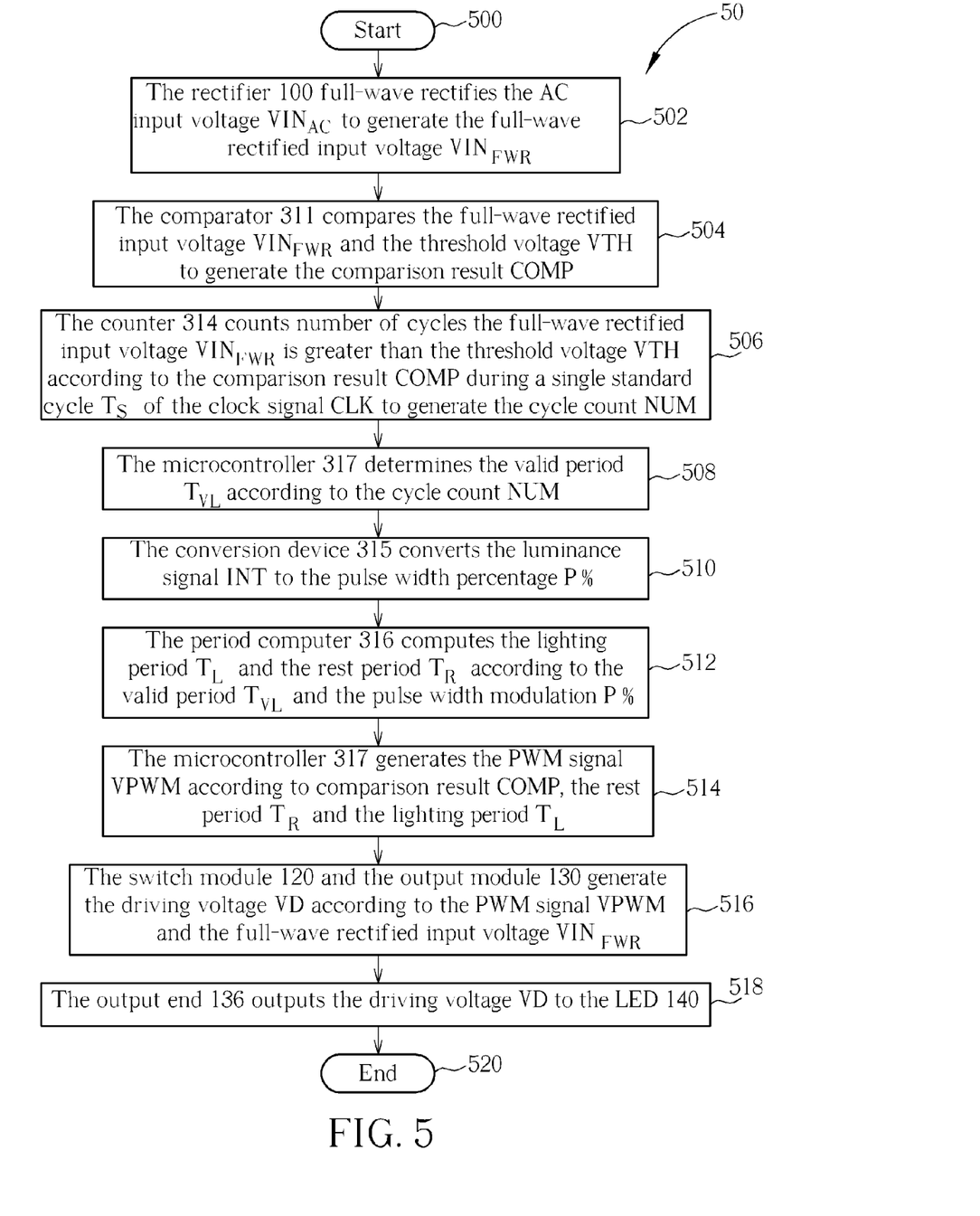
FIG. 5 is a schematic diagram of a LED driving process according to an embodiment of the present invention.

Operations of the LED driving device 30 and the pulse width percentage generator 310 can be summarized into an LED driving process 50, as illustrated in FIG. 5. The LED driving process 50 includes the following steps:

Step 500: Start.

Step 502: The rectifier 100 full-wave rectifies the AC input voltage $VIN_{AC}$ to generate the full-wave rectified input voltage $VIN_{FWR}$.

Step 504: The comparator 311 compares the full-wave rectified input voltage $VIN_{FWR}$ and the threshold voltage VTH to generate the comparison result COMP.

Step 506: The counter 314 counts number of cycles the full-wave rectified input voltage $VIN_{FWR}$ is greater than the threshold voltage VTH according to the comparison result COMP during a single standard cycle $T_s$ of the clock signal CLK to generate the cycle count NUM.

Step 508: The microcontroller 317 determines the valid period $T_{VL}$ according to the cycle count NUM.

Step 510: The conversion device 315 converts the luminance signal INT to the pulse width percentage P %.

Step 512: The period computer 316 computes the lighting period $T_L$ and the rest period $T_R$ according to the valid period $T_{VL}$ and the pulse width modulation P %.

Step 514: The microcontroller 317 generates the PWM signal VPWM according to comparison result COMP, the rest period $T_R$ and the lighting period $T_L$.

Step 516: The switch module 120 and the output module 130 generate the driving voltage VD according to the PWM signal VPWM and the full-wave rectified input voltage $VIN_{FWR}$.

Step 518: The output end 136 outputs the driving voltage VD to the LED 140.

Step 520: End.

Details of the LED driving process 50 can be referred from previous descriptions about the LED driving device 30 and the pulse width percentage generator 310, and are not further narrated herein.

In the prior art, the LED is driven by a direct current (DC) voltage, and thus an AC voltage, such as a voltage provided by mains power, has to be converted into the DC voltage through a large capacitor. In such a situation, partial LED lamps cannot be implemented, since the large capacitor is not allowed due to cost and specification concerns. In comparison, the LED 140 is directly driven by the full-wave rectified input voltage $VIN_{FWR}$ according to the present invention, and the large capacitor is no longer required. In addition, the present invention uses the periodic and symmetrical waveform of the full-wave rectified input voltage $VIN_{FWR}$ to generate the desired PWM signal VPWM to control the duty cycle of the LED 140. As a result, the LED 140 is correctly lit for P % of time without employing complex control circuits.

To sum up, the present invention directly drives the LED by the AC voltage to avoid the usage of the large capacitor, and uses the periodic waveform of the AC voltage as a reference when determining the duty cycle of the LED to switch the LED to a desired luminance level.

Those skilled in the art will readily observe that numerous modifications and alterations of the device and method may be made while retaining the teachings of the invention.

What is claimed is:

1. A method for driving a light-emitting diode (LED) by an alternating current (AC) input voltage, the method comprising:

rectifying the AC input voltage to generate a full-wave rectified input voltage;

generating a pulse width modulation (PWM) signal according to the full-wave rectified input voltage and a luminance signal, wherein the luminance signal indicates a pulse width percentage;

generating a driving voltage according to the PWM signal and the full-wave rectified input voltage; and outputting the driving voltage to the LED.

2. The method of claim 1, wherein the step of generating the driving voltage according to the PWM signal and the full-wave rectified input voltage comprises generating the driving voltage as $VD=VIN_{FWR}\cap VPWM$;

wherein $VIN_{FWR}$ represents the full-wave rectified input voltage, and VPWM represents the PWM signal.

3. The method of claim 1, wherein the step of generating the PWM signal according to the full-wave rectified input voltage and the luminance signal comprises:

comparing the full-wave rectified input voltage and a threshold voltage to generate a comparison result;

counting number of cycles the full-wave rectified input voltage is greater than the threshold voltage according to the comparison result during a standard cycle of a clock signal to generate a cycle count;

determining a valid period according to the cycle count;

converting the luminance signal into the pulse width percentage;

computing a lighting period and a rest period according to the valid period and the pulse width percentage; and generating the PWM signal according to the comparison result, the rest period and the lighting period.

4. The method of claim 3, wherein the step of generating the PWM signal according to the comparison result, the rest period and lighting period comprises disabling the PWM signal when the comparison result indicates that the full-wave rectified input voltage is smaller than the threshold voltage.

5. The method of claim 4, wherein the step of generating the PWM signal according to the comparison result, the rest period and lighting period further comprises continuing to disable the PWM signal for the rest period when the comparison result indicates that the full-wave rectified input voltage is greater than the threshold voltage, and enabling the PWM signal for the lighting period.

6. The method of claim 3, wherein the step of generating the PWM signal according to the comparison result, the rest period and lighting period comprises enabling the PWM signal when the comparison result indicates that the full-wave rectified input voltage is smaller than the threshold voltage.

7. The method of claim 6, wherein the step of generating the PWM signal according to the comparison result, the rest period and lighting period further comprises continuing to enable the PWM signal for the light period when the comparison result indicates that the full-wave rectified input voltage is greater than the threshold voltage, and disabling the PWM signal for the rest period.

8. The method of claim 3, wherein the step of computing the lighting period and the rest period according to the valid period and the pulse width percentage comprises:

computing the lighting period as $T_L=T_{VL}\times P\%$; and computing the rest period as $T_R=T_{VL}\times(1-P\%)$;

wherein $T_{VL}$ represents the valid period, and P % represents the pulse width percentage.

9. A driving device for driving a light-emitting diode (LED) by an alternating current (AC) input voltage, the driving device comprising:
   a rectifier, for rectifying the AC input voltage to generate a full-wave rectified input voltage;
   an output module, for generating a driving voltage according to a pulse width modulation (PWM) signal and the full-wave rectified input voltage;
   an output end, for outputting the driving voltage to the LED;
   a pulse width percentage generator, for generating the PWM signal according to the full-wave rectified input voltage and a luminance signal, wherein the luminance signal indicates a pulse width percentage; and
   a switch module, for determining whether the full-wave rectified input voltage is sent to the output module according to the PWM signal.

10. The driving device of claim 9, wherein the pulse width percentage generator comprises:
   a comparator, for comparing the full-wave rectified input voltage and a threshold voltage to generate a comparison result;
   a counter, for counting number of cycles the full-wave rectified input voltage is greater than the threshold voltage according to the comparison result during a standard cycle of a clock signal to generate a cycle count;
   a microcontroller, for determining a valid period according to the cycle count and generating the PWM signal according to the comparison result, a rest period and a lighting period;
   a conversion device, for converting the luminance signal into the pulse width percentage; and
   a period computer, for computing the lighting period and the rest period according to the valid period and the pulse width percentage.

11. The driving device of claim 9, wherein the switch module comprises:
   a front end, for receiving the PWM signal;
   an upper-bridge switch transistor, coupled to the front end, the rectifier, the pulse width percentage generator and the output module, for determining whether the rectifier is electrically connected to the output module according to an in-phase signal of the PWM signal; and
   a lower-bridge switch transistor, coupled to a ground end, the front and the output module, for determining whether the ground end is electrically connected to the output module according to an inverted signal of the PWM signal.

12. The driving device of claim 11, wherein the switch module further comprises:
   an in-phase amplifier, coupled between the front end and the upper-bridge switch transistor, for amplifying the PWM signal to generate the in-phase signal sent to the upper-bridge switch transistor; and
   an inverting amplifier, coupled between the front end and the lower-bridge switch transistor, for inverting and amplifying the PWM signal to generate the inverted signal sent to the lower-bridge switch transistor.

13. The driving device of claim 9, wherein the output module comprises:
   an output inductor, coupled between the switch module and the output end; and
   an output capacitor, coupled between the output end and a ground end.

14. A pulse width percentage generator for generating a pulse width modulation (PWM) signal according to a full-wave rectified input voltage and a luminance signal, the pulse width percentage generator comprising:
   a comparator, for comparing the full-wave rectified input voltage and a threshold voltage to generate a comparison result;
   a counter, for counting number of cycles the full-wave rectified input voltage is greater than the threshold voltage according to the comparison result during a standard cycle of a clock signal to generate a cycle count;
   a microcontroller, for determining a valid period according to the cycle count and generating the PWM signal according to the comparison result, a rest period and a lighting period;
   a conversion device, for converting the luminance signal into a pulse width percentage; and
   a period computer, for computing the lighting period and the rest period according to the valid period and the pulse width percentage.

15. The pulse width percentage generator of claim 14 further comprising:
   a threshold voltage generator, for generating the threshold voltage; and
   an oscillator, for generating the clock signal.

16. The pulse width percentage generator of claim 14, wherein the period computer computes the lighting period as $T_L=T_{VL} \times P\%$ and computes the rest period as $T_R=T_{VL} \times (1-P\%)$;
   wherein $T_{VL}$ represents the valid period, and P % represents the pulse width percentage.

17. The pulse width percentage generator of claim 14, wherein the microcontroller disables the PWM signal when the comparison result indicates that the full-wave rectified input voltage is smaller than the threshold voltage.

18. The pulse width percentage generator of claim 17, wherein the microcontroller continues to disable the PWM signal for the rest period when the comparison result indicates that the full-wave rectified input voltage is greater than the threshold voltage, and then enables the PWM signal for the lighting period.

19. The pulse width percentage generator of claim 14, wherein the microcontroller enables the PWM signal when the comparison result indicates that the full-wave rectified input voltage is smaller than the threshold voltage.

20. The pulse width percentage generator of claim 19, wherein the microcontroller continues to enable the PWM signal for the lighting period when the comparison result indicates that the full-wave rectified input voltage is greater than the threshold voltage, and then disables the PWM signal for the rest period.

* * * * *